May 15, 1923.

H. L. CONDÉ

1,455,045

GAME APPARATUS

Filed March 25, 1922    2 Sheets-Sheet 1

Inventor
Harry L. Condé
By his Attorney
Maurice Block

May 15, 1923.
H. L. CONDÉ
GAME APPARATUS
Filed March 25, 1922
1,455,045
2 Sheets-Sheet 2
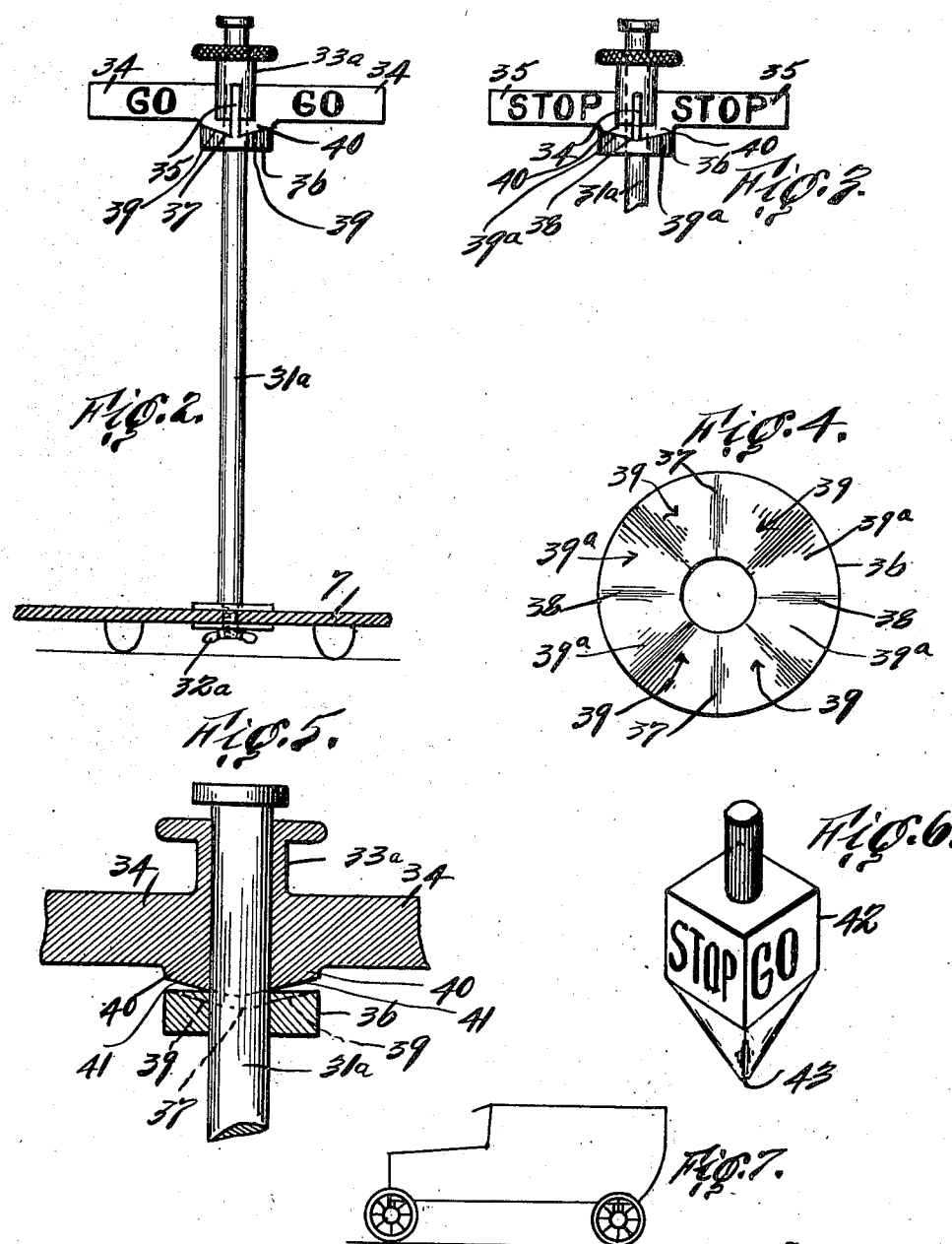

Patented May 15, 1923.

1,455,045

UNITED STATES PATENT OFFICE.

HARRY L. CONDÉ, OF SYRACUSE, NEW YORK.

GAME APPARATUS.

Application filed March 25, 1922. Serial No. 546,583.

*To all whom it may concern:*

Be it known that I, HARRY L. CONDÉ, a resident of Syracuse, Onondaga County, State of New York, and a citizen of the United States of America, have invented certain new and useful Improvements in Game Apparatus, of which the following is a specification.

This invention relates to improvements in game apparatus, one of the objects being to provide a source of amusement for children or their elders. While one of the objects of my invention is to provide an amusement device, its main object is to provide means in the form of a game to teach children and also their elders the rules governing the movement and handling of motor vehicles, through the streets of a city, or in other words to teach traffic regulations in a way that will impress children and grown people. By providing a game based upon the rules governing traffic, a lasting impression will be left upon the minds of the players, which will stand them in good stead when they are operating a vehicle should the players be of mature age. Upon the minds of children, an impression will be made that they will remember.

The game is played by means of a chart laid off to represent city streets, a miniature vehicle, and an especially arranged traffic sign which governs the movement of the vehicle. When the vehicles are moved, or rather the vehicles in toy form, they must obey traffic rules, which will, of course, be printed and studied so as to acquaint the players with said rules. The traffic sign will contain the traffic indications Go and Stop, and will be arranged so that it can be spun so as to cause either Go or Stop to be presented toward the player whose turn it is to move. If the word Go appears, the player moves his vehicle. If Stop appears, he loses his turn and another player spins the traffic sign.

I will now describe my invention in detail, the novel features of which I will point out in the appended claims, reference being had to the accompanying drawings, wherein:—

Fig. 2 is a detail view, enlarged, of a form of traffic sign which I prefer to use;

Fig. 3 is a similar view, the supporting post being broken away, looking from the right in Fig. 2;

Fig. 4 is a detail plan view enlarged of a portion of the sign device;

Fig. 5 is a fragmentary sectional view, enlarged, illustrating the sign as raised in order to be spun;

Fig. 6 illustrates a modified form of a spinner; and

Fig. 7 is a detail view of a form of toy vehicle which I prefer to use.

Figure 1:
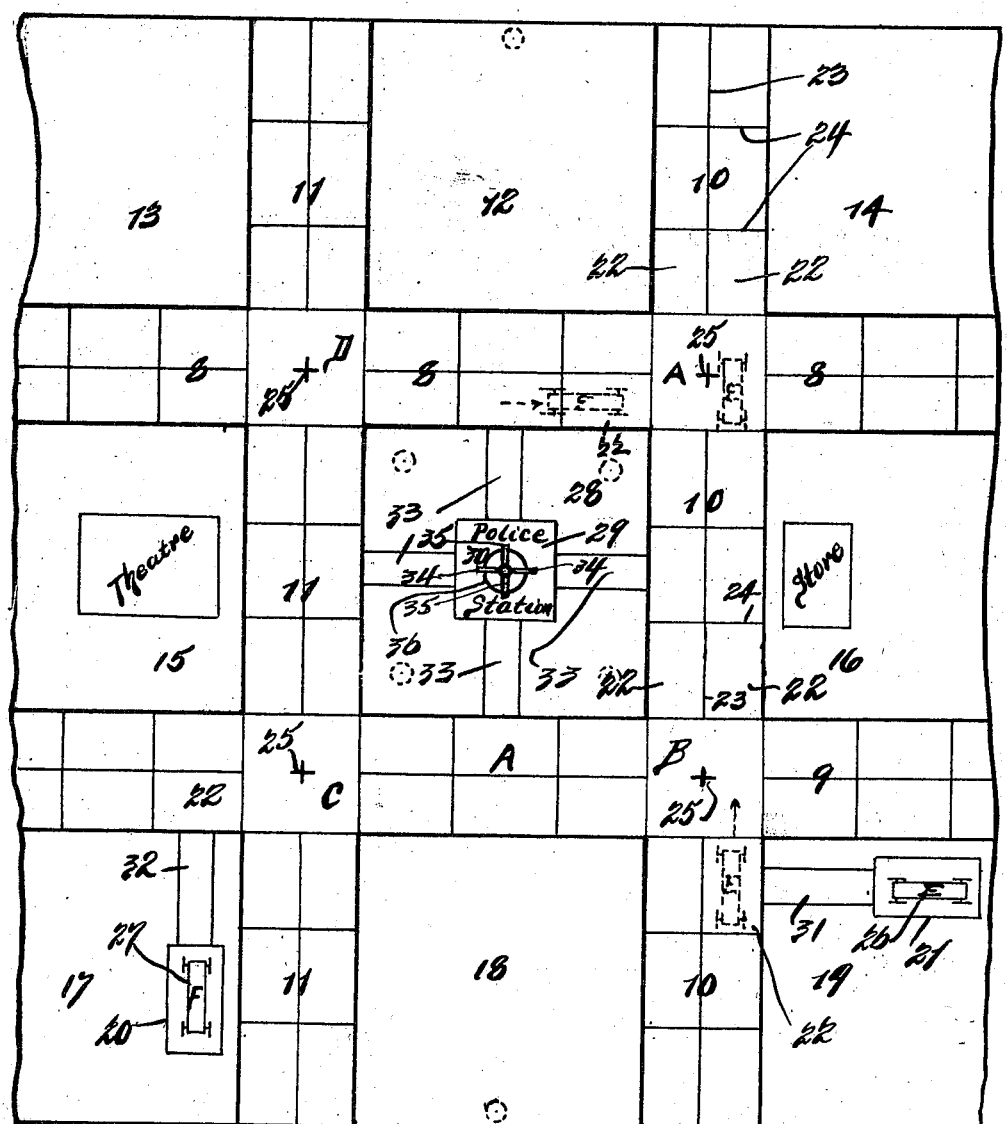
Fig. 1 is a plan view illustrating a form of chart which forms part of the game.

My improved game, as herein arranged, is comprised of a chart 7 laid out to contain the representation of streets 8, 9, 10 and 11. The spaces 12, 13, 14, 15, 16, 17, 18 and 19 represent squares or blocks containing buildings in the form of residences, stores, etc., which are not shown, excepting in spaces 15, 16, 17 and 19, which contain respectively, a theatre, store and garages, the garages being indicated by 20 and 21 in squares 17 and 19, respectively. Each street 8, 9, 10 and 11 is divided off into sections 22 by lines 23 and 24. The spaces A, B, C and D represent the street intersections and each contains a traffic post indication 25. The spinner, which controls the movement of the toy vehicles, indicated by 26 and 27 and illustrated in Fig. 7, is positioned in a square 28 and within a smaller square 29, within square 28, which represents the police station, the spinner referred to being indicated by 30. The oblong spaces 31, 32 and 33 represent driveways.

The spinner 30 is comprised of a post or support 31$^a$ Fig. 2, secured (in this instance), at its lower end, to the chart 7, by a wing-nut 32$^a$, and may be removed. At its upper end post 31$^a$ carries a loosely mounted rotatable block 33$^a$ carrying semaphore arms 34, 34 and arms 35, 35, arms 34 being in alinement and positioned at a right angle to arms 35 which are also in alinement. In this instance, arms 34 are provided with the signal Go and arms 35 with the signal Stop.

To cooperate with arms 34, 34, and 35, 35, to cause them to come to rest, after being spun, in a position parallel with streets 8 and 9 and 10 and 11, I provide a collar 36 having depressions 37, 37 and 38, 38, located at the juncture of the lower ends of inclined walls 39$^a$, respectively, said depressions being arranged to receive the projections 40 carried by arms 34, 34 and 35, 35, each projection having an inclined wall 41, the inclined walls 41 being indicated by said reference numeral in Fig. 5 only to avoid confusion.

In this instance, chart 7 is arranged for two players only, but it can be arranged for more if desirable. To play the game, each player will place a toy vehicle in the garages, indicated on the chart, the spinner 30 being placed in the square 29, with the arms 34, 34 and 35, 35, positioned at right angles to the streets 9 and 10, in this instance; this is merely an illustration of one way to prepare the chart for game. Assuming a player has placed vehicle 26 in garage 21 and another player has placed his vehicle 27 in garage 20; one of the players, which I will term E, and the other F, for instance, will spin the cross arms 34 and 35, after having lifted block 33 out of the recesses in collar 36, as indicated in Fig. 5. The momentum of the arms 34 and 35 will cause them to continue to revolve until the resistance offered by the inclined walls 39 and 39ª cause them to come to rest. When the arms slow down, they will finally come to rest in recesses 37 and 38. Should the arms 34 and 35 stop in the position indicated in Fig. 1, or in other words, with the signal Go, presented toward vehicle 26, belonging to E, E will move his vehicle out of the garage into space 22 in front of same, as indicated by dotted lines Fig. 1. It may be here stated that each player will select a point of destination and the one who arrives at his destination first wins the game. In making the trip, a player must obey traffic rules, such as keeping on the right side of the street, turning a traffic post 25 on its right, avoid turning in the middle of a block, cutting corners, etc. If E wishes to go to the theatre in space 15, he must go up street 10 to street 8, turn post 25 in space A, then along street 8 to street 11, turn post 25 in space D, then down street 11, keeping on the right all the way. Should the vehicle pass a traffic post 25 on its left, it will cut the corner, thereby disobeying a traffic rule. Should a player do this, he would have to move his vehicle to the police station, and then start over again from there, losing all the moves he had previously made. Each player moves one space.

To resume, supposing E has moved into space 22 and desires to go to the theatre in space 15. After E has moved, F will spin the arms 34 and 35. Should the arms come to rest with the word Stop, presented toward garage 20, F could not move. In that event E spins again; should he be directed to go he will move into space or intersection B of streets 9 and 10; should Stop appear, he could not move, and F would spin again. If he was directed to Go, he would move into space 22 in front of garage 20. If F desires to go to the store in space 16, he could go by the way of streets 9 and 10 or by the way of streets 11, 8 and 10. No two vehicles can occupy the same space at the same time; the one arriving in a space first has the right of way and the second one arriving loses a turn by reason of the fact that he cannot go even if directed to do so by the traffic sign. Should E move into space A, while F is in space 22, at the corner of streets 8 and 10, as indicated by dotted lines, F could not move into the space and would have to go to the police station, as this would be an indication of a collision. A player in going to the police station has to go in the regular way, or as directed by the spinner in space 29. At street intersections two moves are necessary, one to move in and one to move out.

The game may be played with the aid of cards containing points of destination. For instance, when a game is started, a player draws a card, indicating a destination, for a first stop; when he gets there he draws another for a second stop, and so on. As has been stated, a player must obey all traffic rules; if he does not, he is arrested and is therefore set back.

Various rules can be set down in addition to the regular traffic rules. If desirable, a spinner 42, Fig. 6, may be used, consisting of a cube, containing the words Stop and Go, having a pointed end 43.

It will, of course, be understood that the method of playing the game may be varied, if desired.

What I desire to secure by Letters Patent is:—

1. In a game, a chart containing representations of the streets of a town or city, the streets being divided into spaces, game pieces movable over the face of the chart arranged to follow the street indications, a post carried by the chart, a rotatable member carried by the post having marked thereupon the traffic signals Stop and Go, whereby the game pieces may be signaled to advance from square to square.

2. In a spinner for game apparatus, comprising a support, a plurality of arms rotatably mounted upon the support arranged to be spun, signals carried by the arms, and means to cause the arms to come to rest in a predetermined position after having been spun.

3. In a spinner for game apparatus, comprising a support, a plurality of arms rotatably mounted upon the support arranged to be spun, and a collar carried by the support located under said arms, said collar having recesses to receive said arms, inclined walls extending from said recesses upwardly, whereby said arms will settle into said recesses when said arms come to rest after having been spun, to position the arms in a predetermined position.

4. In a game, a chart marked to represent the streets of a city, said streets being blocked off in sections, game pieces movable over the face of the chart and arranged to advance from section to section, a support associated with said chart, a plurality of arms rotatably mounted upon the support and arranged to be spun, signals carried by the arms, and means for causing the arms to come to rest in a position parallel with the streets, the movements of the game pieces being controlled by the signals presented when the spinner has come to rest.

HARRY L. CONDÉ.